(12) United States Patent
Rosine

(10) Patent No.: US 6,311,001 B1
(45) Date of Patent: Oct. 30, 2001

(54) MICROCHANNEL PLATE HAVING MICROCHANNELS WITH FUNNELED OPENINGS AND METHOD FOR MANUFACTURING SAME

(75) Inventor: Steven David Rosine, Roanoke, VA (US)

(73) Assignee: LTT Manufacturing Enterprises, Wilmington, DE (US)

(*) Notice: Subject to any disclaimer, the term of this patent is extended or adjusted under 35 U.S.C. 154(b) by 0 days.

(21) Appl. No.: 09/413,159

(22) Filed: Oct. 6, 1999

Related U.S. Application Data

(60) Provisional application No. 60/104,638, filed on Oct. 16, 1998.

(51) Int. Cl.$^7$ .................................................. G02B 6/04
(52) U.S. Cl. ................................................ 385/120
(58) Field of Search ................................ 385/115, 120

(56) References Cited

U.S. PATENT DOCUMENTS

| | | | |
|---|---|---|---|
| 4,737,013 | * 4/1988 | Wilcox | 385/120 |
| 5,493,169 | 2/1996 | Pierle et al. | |
| 5,776,538 | * 7/1998 | Pierle et al. | 427/78 |

OTHER PUBLICATIONS

J.R. Horton, et al., Characteristics and Applications of Advanced Technology Microchannel Plates, Sociedty of Photo–Optical Instrumentation Engineers, vol. 1306, 1990, pp. 169–178.

Martin J. Needham, Microchannel Plates Advance Night-Viewing Technology, Electronics—The International Magazine of Electronics Technology, vol. 46, No. 20, Sep. 27, 1973, pp. 117–124.

* cited by examiner

*Primary Examiner*—Akm E. Ullah
*Assistant Examiner*—Michelle R. Connelly-Cushwa
(74) *Attorney, Agent, or Firm*—Arthur L. Plevy; Duane Morris LLP

(57) ABSTRACT

A process for forming improved microchannel plates ("MCP") for use in image intensifier tubes, the MCPs providing improved signal to noise, and reduced image distortion. The improved MCPs are first conventionally formed from the fusion of a plurality of glass fibers into a solid rod, where each fiber has an acid etchable core and acid-resistant cladding. Individual plates are then sliced transversely from the rod and polished. The MCP is then partially chemically etched with an alkaline material. The MCP is next subjected to an acid bath that removes the cores, optionally followed by a hot strong alkali bath that removes additional acid resistant cladding from the glass. Microchannels having funnel-shaped open ends are thereby formed in the MCP which allows for more efficient and accurate photoelectron generation.

20 Claims, 4 Drawing Sheets

MICROCHANNEL PLATE HAVING MICROCHANNELS WITH FUNNELED OPENINGS AND METHOD FOR MANUFACTURING SAME

This application claims the benefit of U.S. Provisional Application No. 60/104,638 entitled, "MCP Funneled Input by Chemical Etching," filed by applicant on Oct. 16, 1998.

FIELD OF THE INVENTION

This invention relates to microchannel plates for use in image intensifier tubes, and in particular, to a microchannel plate having microchannels with funneled openings produced by partially removing interface layers defined by cores and clad layers of fibers which form the microchannel plate.

BACKGROUND OF THE INVENTION

Image intensifier tubes are used in night/low light vision applications to amplify ambient light into a useful image. A typical image intensifier tube is a vacuum device, roughly cylindrical in shape, that generally includes a body, photocathode and faceplate, microchannel plate (MCP), and output optic and phosphor screen. Incoming photons are focused on the glass faceplate by external optics, and strike the photocathode which is bonded to the inside surface of the faceplate. The photocathode or cathode converts the photons to electrons, which are accelerated toward the input side or electron-receiving face of the MCP by an electric field. The MCP has many microchannels, each of which functions as an independent electron amplifier, and roughly corresponds to a pixel of a CRT. The amplified electron stream emanating from the output side or electron-discharge face of the MCP excites the phosphor screen and the resulting visible image is passed through the output optics to any additional external optics. The body holds these components in precise alignment, provides electrical connections, and also forms the vacuum envelope.

Conventional MCPs are formed from the fusion of a large number of glass fibers, each having an acid etchable glass core and one or more acid-resistant glass cladding layers, into a solid rod or boule. Individual plates are sliced transversely from the boule, polished, and chemically etched. The MCPs are then subjected first to a hydrochloric acid bath that removes the acid etchable core rod (decore), followed by a hot sodium hydroxide bath that removes mobile alkali metal ions from the glass cladding.

The microchannels of a MCP are typically cylindrical in shape and inclined 1–10° from normal to the MCP surface, The ratio of the combined channel area to the overall active area of the MCP is known as open-area-ratio (OAR). The ratio of the core rod area to overall area prior to acid etch is approximately 45%.

Acid etching (decore) of the MCP increases OAR to 55%, and the alkaline (e.g. sodium hydroxide) leach step further increases the OAR to approximately 60% by alkali removal of acid-resistant cladding.

Unfortunately, the output image of conventional MCPs is degraded, i.e., the output image is not a perfect replica of the input image. Degradation of the output image is caused by a number of factors. For example, a photoelectron released from the photocathode may not fall into one of the microchannels of a conventional MCP but, will impact the flat face of the MCP in a region between the openings of the microchannels. Electrons that hit the flat face are likely to be deflected or bounce back toward the photocathode before being directed back to the MCP by the electrostatic field. These bounced photoelectrons produce a number of secondary electrons from a part of the MCP that is not aligned with the proper location of photocathode generation. Such an alignment problem results in both decreased signal-to-noise ratio, and distortion of the image produced by the image intensifier, i.e., halos in the output image. At other times the errant electron is simply absorbed by the face of the plate and is not further amplified, thus reducing the signal-to-noise ratio.

One solution to this problem is to increase the open-area ratio by using fibers with thinner acid resistant cladding layers relative to the acid soluble cores. However, a MCP having parallel walls is limited to an open area ratio of approximately 65% so that 1) sufficient glass remains for structural integrity, and 2) no deleterious electric field effects appear. These latter electric field effects are induced by spike structures resulting from close packed, thin clad fibers after acid etching.

Accordingly, there remains a need for an improved MCP which overcomes the disadvantages of conventional MCPs.

SUMMARY OF THE INVENTION

A method of making a microchannel plate having a plurality of microchannels with funnel-shaped openings, the microchannel plate used as an electron multiplier in an image intensifier tube. The method comprises providing a plurality of glass fibers each having an acid etchable core, an acid resistant cladding, and an interface therebetween, and forming the glass fibers into a thin plate of glass. The plate is first treated with an alkaline material having an affinity for the acid resistant cladding to etch the cladding at the interface to a pre-determined depth. The plate is then treated in an acid solution for a predetermined time and temperature to form a plurality of microchannels in the plate, the microchannels having funnel-shaped openings.

Further, a microchannel plate having a plurality of microchannels with funnel-shaped openings made according to the above method.

BRIEF DESCRIPTION OF THE DRAWINGS

The advantages, nature, and various additional features of the invention will appear more fully upon consideration of the illustrative embodiments now to be described in detail in connection with accompanying drawings wherein:

FIG. 4 is a cross-sectional view through a segment of a wafer formed from the fibers shown in FIGS. 3A and 3B;

It should be understood that the drawings are for purposes of illustrating the concepts of the invention and are not to scale.

DETAILED DESCRIPTION OF THE INVENTION

Figure 1:
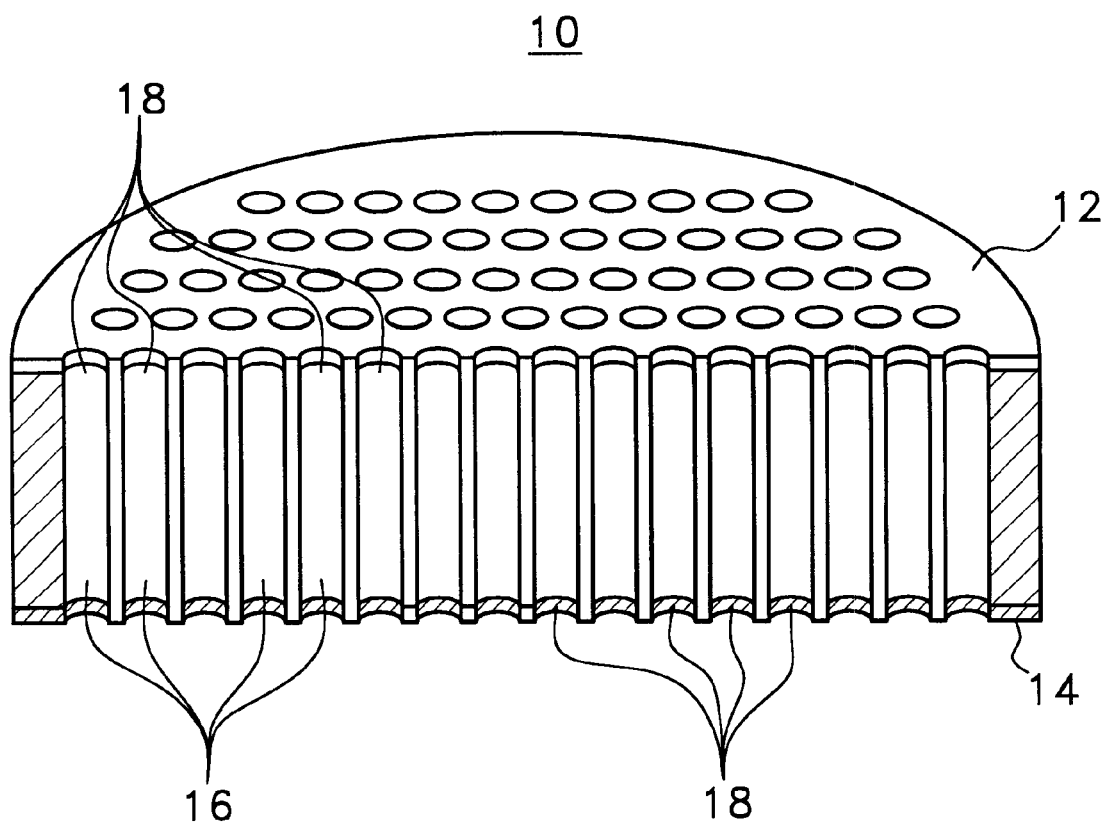
FIG. 1 is a sectional view of a microchannel plate made according to an embodiment of the invention.

FIG. 1 shows a microchannel plate 10 (MCP) according to an embodiment of the invention. The MCP 10 has an input side 12, an output side 14, and a plurality of microchannels 16 with funneled openings 18 extending between the input and output sides 12, 14 thereof. The microchannel openings 18 can be funneled on just the input side 12 of the MCP 10, on just the output side 14 of the MCP 10, or on both the input and output sides 12, 14 of the MCP 10 (shown).

Figure 2:
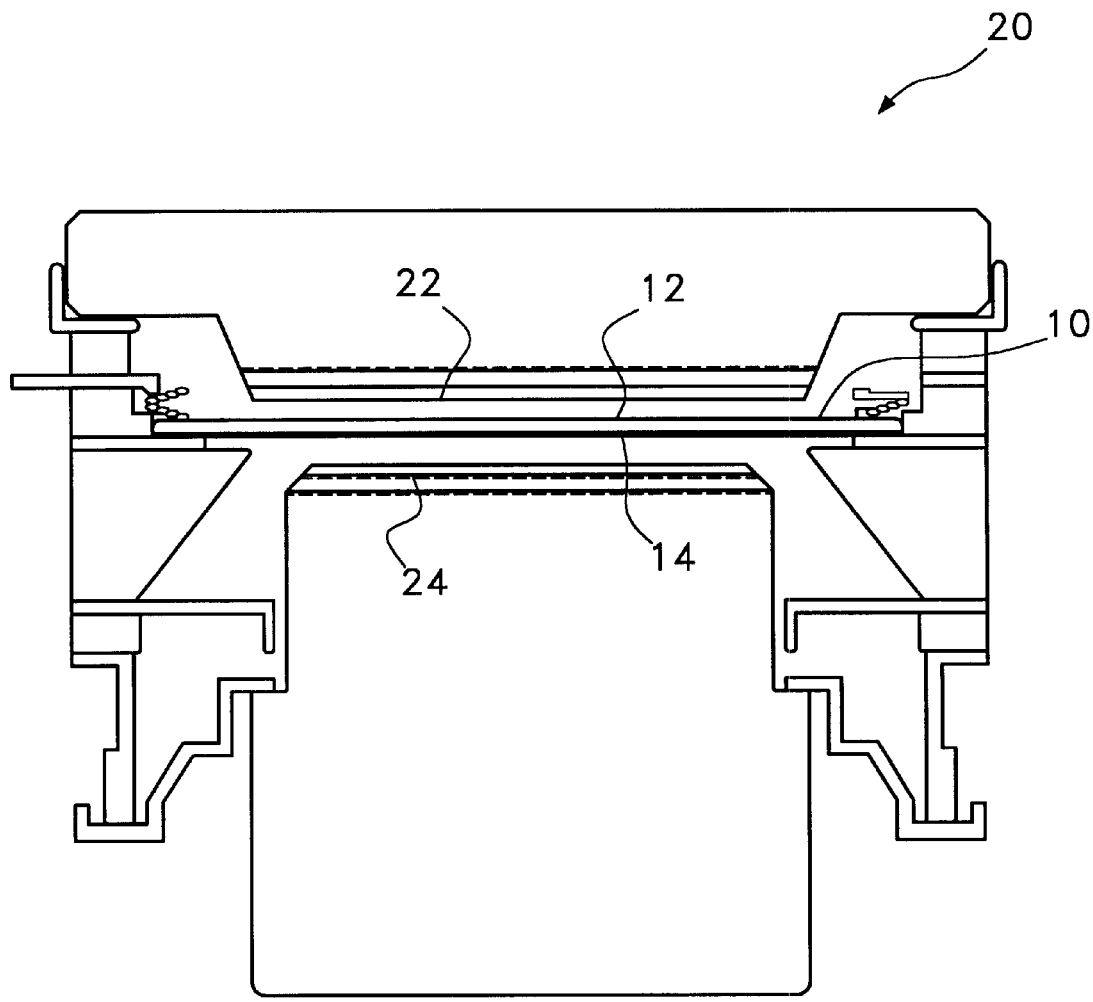
FIG. 2 is an elevational view of a typical image intensifier tube commonly employed in night/low light vision devices, the tube employing the microchannel plate of the invention.

FIG. 2 shows the MCP 10 of the invention, as used in a typical image intensifier tube 20 commonly employed in night/low light vision devices. In addition to the MCP 10, the image intensifier 20 includes a photocathode 22 and a phosphor screen 24(anode). Incident light impinging on the photocathode 22 produces electrons which are accelerated toward the input side or electron-receiving face 12 of MCP 10 by an electric field. The amplified electron stream exits the output side or electron-discharge face 14 and impinges on the phosphor screen 24 resulting in a visible image corresponding to the low light image.

Figure 3A:
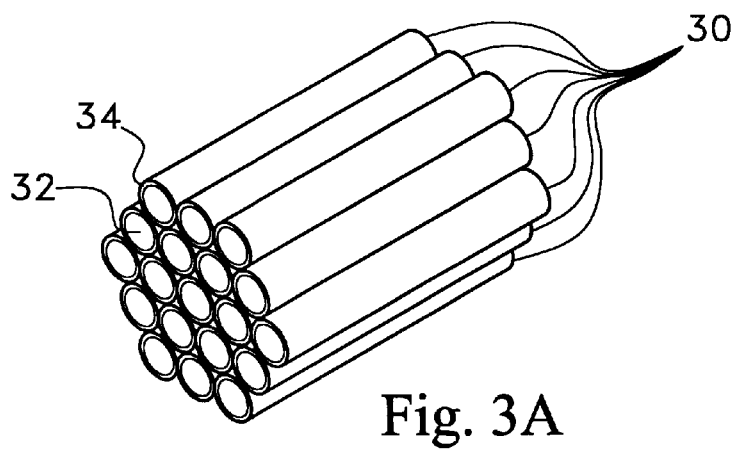
FIGS. 3A and 3B are perspective views depicting the initial fabrication of the microchannel plate of the invention from a plurality of glass fibers.
Figure 3B:
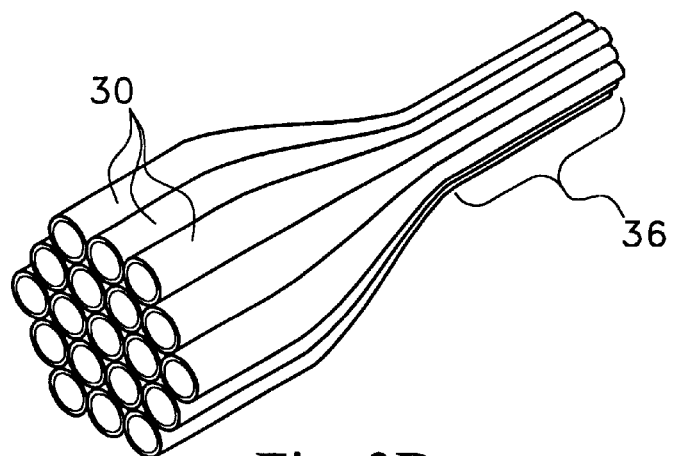
Figure 3C:
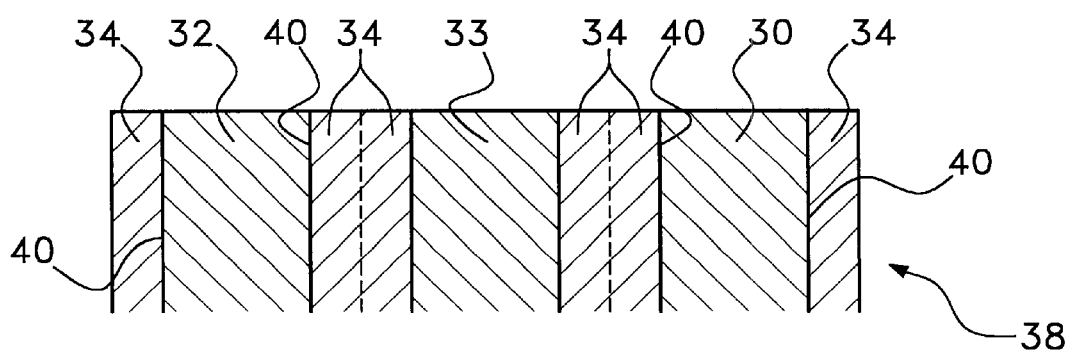

As shown in FIG. 3A, fabrication of the MCP 10 of FIG. 1 commences by providing a plurality of glass fibers 30 each having core 32 made from an alkali-resistant, acid-soluble glass, and an exterior clad layer 34 made from an alkali-soluble, acid-resistant glass, that surrounds the core 32. The fibers 30 are drawn down to microscopic sizes in a fused bundle 36 as shown in FIG. 3B using methods well known to those skilled in the art. Next, the fused bundle 36 of fibers 30 is sliced into thin wafers of glass and optically polished.

FIG. 4 shows a cross-sectional view through a segment of one of the wafers as denoted by numeral 38. Because different glass compositions are used for the core 32 and clad 34, the thermal expansion coefficients of these glasses typically differ slightly. This difference in expansion is significant enough to impart considerable stress at the interface 40 of the core 32 and the clad 34 (core/clad interface 40) after exposure to high temperature during fusion of the fibers 30. Although the wafers 38 are annealed to attempt to minimize this stress, some stress usually remains.

In the method of the invention, the stressed core/clad interfaces 40 enable funneled microchannels to be fabricated in the wafers 38. This is accomplished in the inventive method in a two or optional three step process. The first step involves processing the wafers 38 in a conventional alkaline leach process. The second step involves processing the wafers 38 in a conventional acid decore process. The optional third step involves processing the wafers 38 again in a conventional alkaline leach process.

Figure 5:
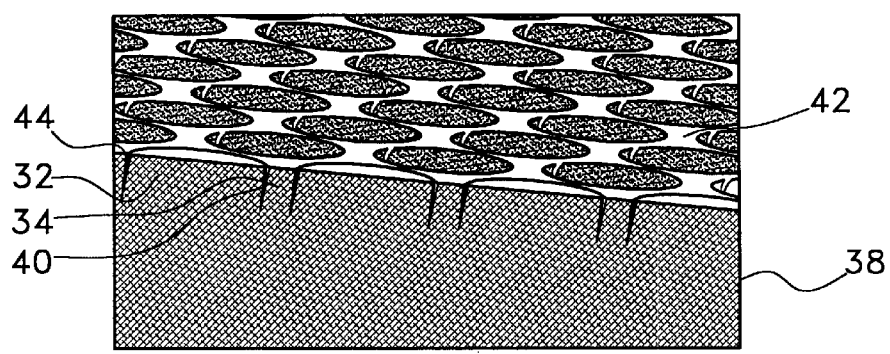
FIG. 5 is an electron micrograph which shows a surface of a wafer formed from the fibers shown in FIGS. 3A and 3B after performing the first alkaline leach process.

FIG. 5 shows a surface 42 of one of the wafers 38 after performing the first alkaline leach process. As can be seen, the alkaline material preferentially etches a portion of the acid resistant clad glass 34 at each stressed core/clad interface 40 to produce grooves 44 in the surface 42 of the wafer 38 about the cores 32. Each groove 44 has a depth D much greater than its width W. The depth D of the grooves 44 is determined by several factors including the affinity of the specific alkaline etchant for the clad glass 34, and the time and temperature employed for the leach process.

Figure 6:
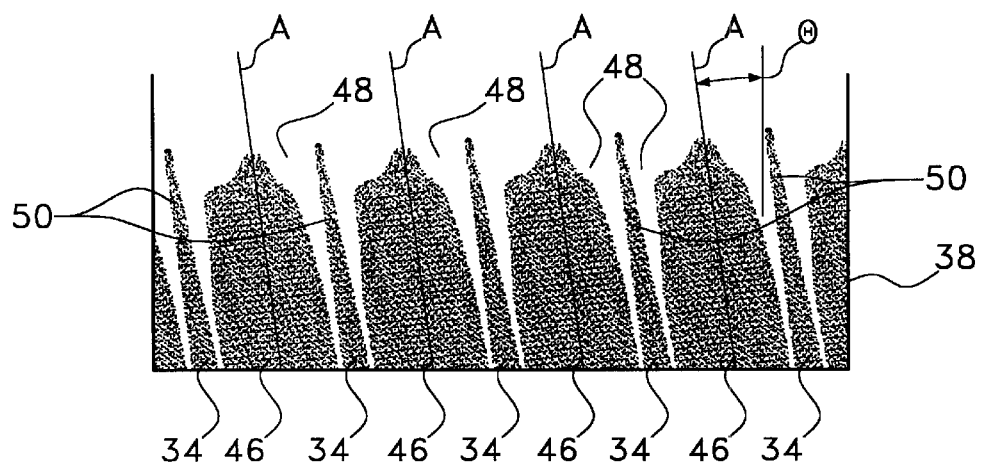
FIG. 6 is an electron micrograph which shows the wafer of FIG. 5 after performing the acid decore process.

FIG. 6 shows the wafer 38 of FIG. 5 after performing the acid decore process. As can be seen, the acid decore step removes the cores 32 (FIG. 5) thus, producing the microchannels 46 (the microchannels 16 of MCP 10 in FIG. 1) in the wafer 38 with outwardly funneled openings 48 (the funneled openings 18 of MCP 10 in FIG. 1) angled between 3° to 20°, (usually about 10°) as measured from axes A of the microchannels 46. The remaining portions of clad glass 34 formerly adjacent to and disposed around cores 32 (FIG. 5), form the walls 50 of the microchannels 46.

Figure 7:
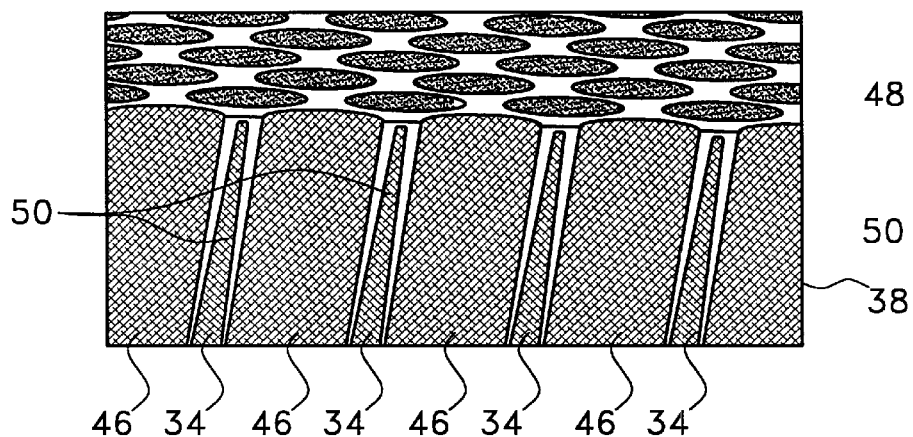
FIG. 7 is an electron micrograph which shows the wafer of FIG. 6 after further alkaline leach processing.

FIG. 7, shows the wafer 38 of FIG. 6 after further alkaline leach processing. Subsequent alkaline leach processing removes additional clad glass 34 from the microchannel walls 50. Accordingly, the angle of the funneled end portions 48 is reduced due to the more rapid removal of clad material from the interior portions of the microchannel walls 50 as compared to clad material removal at the funneled microchannel openings 48. Although the angle is reduced, it is still present. Additionally, the surface OAR can be made as high as 75% while retaining sufficient channel wall 50 material at a predetermined distance from either or both surfaces of the wafer 38 for the overall structural strength required of an MCP for the specific image tube application presented.

Fibers suitable for use in fabricating MCPs with funneled openings according to the invention are those employing core and clad glass materials where the acid etch mass loss rate of the core glass exceeds the acid etch mass loss rate of the clad glass by a factor of 10:1 to 1000:1, and where the alkali mass loss rate of the clad glass does not exceed the alkali mass loss rate of the core glass. Preferred fibers employ barium silicate glass cores manufactured by Schott under part no. 8016 (thermal expansion coefficient of 100E-7/° C.) and lead silicate glass clad layers manufactured by Corning under part no. 8161 (thermal expansion coefficient of 90.3E-7/° C.). The preferred fibers are fabricated by fusing the core and clad glasses at a temperature of about 760° C. Then during wafer fabrication, the fibers are annealed at a temperature of about 420° C. After annealing, the core/clad interfaces of the fibers exhibit the requisite stress that enables MCPs with funneled openings to be produced according to the invention.

The alkaline each step can be performed with any alkaline material at any temperature where such a combination displays an affinity for the stressed core/clad interface 40. Sodium hydroxide solution of 1 N concentration used at a temperature of 80° C. is especially preferred. Other useful bases are alkali metal hydroxides at temperatures between room temperature and 100° C.

In a preferred embodiment, the first alkaline leach step is performed with e.g. sodium hydroxide, 1N concentration, between 10 to 30 min (range of time) and a temperature of between 60° C. to 90° C. (range of temperature). The grooves preferably have a depth-to-width ratio range of 1:1 to 100:1, with a depth-to-width ratio range of 8:1 to 20:1 being especially preferred.

A strong acid is employed in acid decore processing step of the invention. Suitable acids can be chosen from the group consisting of Mineral Acids, strong organic acids and the like. Such acids have little or no effect on the clad layers 34, therefore, after removal of the cores 32, continued acid exposure has little or no effect on the dimensions of the microchannels 46.

The alkalines, acids, processing temperatures and times, and other parameters described above for the funneling steps depend upon many factors such as the desired dimensions of the MCP, the core and clad glass materials used in fabricating the fibers, etc. Those persons skilled in the MCP fabrication art can adjust one or more of these parameters to adapt the funneling process to fabricate a MCP with the desired characteristics.

The inventive method will process both surfaces of each wafer 38 (the input and output sides 12, 14 of the MCP 10). In some applications it may be desirable to funnel the microchannel openings on only one side of the MCP (either the input or output side). This can be accomplished by masking the surface of each wafer 38 where funneling is not desired with chemical resistant tape or film during the initial alkaline leach step. Examples of suitable chemically resistant materials include Electroplating tape, photolithography photoresist, wax, o-ring seals, and the like.

While the foregoing invention has been described with reference to the above embodiments, various modifications and changes can be made without departing from the spirit of the invention. Accordingly, all such modifications and changes are considered to be within the scope of the appended claims.

What is claimed is:

1. A method for making a microchannel plate having a plurality of microchannels with funnel-shaped openings, said microchannel plate used as an electron multiplier in an image intensifier tube, said method comprising the steps of:

providing a plurality of glass fibers, said fibers each having an acid etchable core, an acid resistant cladding, and an interface therebetween;

forming the glass fibers into a thin plate of glass;

treating said plate with an alkaline material having an affinity for said acid resistant cladding to etch the cladding at said interface to a pre-determined depth; and treating said plate in an acid solution for a predetermined time and temperature to form a plurality of microchannels in said plate, said microchannels having funnel-shaped openings.

2. The method of claim 1, wherein the acid resistant cladding is etched to a depth of greater than 100% the diameter of the acid etchable core.

3. The method of claim 1, wherein the ratio of the depth etched to the diameter of the acid etchable core is in the range of 0.5 to 3.

4. The method of claim 1, further comprising the step of alkaline etching said acid treated channel for a predetermined time.

5. The method of claim 1, wherein said alkaline etching of said interface layer is conducted with an alkaline bath of 0.4 to 15% w/w concentration of sodium hydroxide for 1 to 240 minutes at a temperature range of 20 to 100C.

6. The method of claim 1, wherein said acid etching is conducted with an acid bath of 1 to 37% w/w concentration of hydrochloric acid for 10 min to 24 hours at a temperature range of 10 to 40C.

7. The method of claim 1, wherein said alkaline etching bath contains a compound selected from the group consisting of ammonium hydroxide, potassium hydroxide, sodium hydroxide, and other alkali metal hydroxides.

8. The method of claim 1, wherein said acid etching bath contains a compound selected from the group consisting of hydrochloric acid, hydrofluoric acid, nitric, sulfuric and other mineral acids.

9. The method of claim 1, wherein said step of treating said plate with an alkaline material includes masking an output face of the plate with chemical resistant tape or film so that funneled openings are provided only on an electron input side of the plate.

10. The method of claim 1, further comprising the step of treating said plate with an alkaline material having an affinity for said acid resistant cladding after said step of treating said plate with an acid solution.

11. The method of claim 1, wherein the funneled openings are provided on electron input and output sides of the plate.

12. A microchannel plate used as an electron multiplier in an image intensifier tube having an electron receiving face and an electron-discharge face, said microchannel plate comprising a glass plate formed by a plurality of fused glass fibers, each of the fibers defining an open ended microchannel having a wall defined by a clad layer of the fiber, wherein at least one of said open ends of each microchannel is funneled by removing the clad layer in an alkaline material at an interface of the clad layer and a core.

13. The microchannel plate of claim 12, wherein said microchannels are oriented at an angle relative to surfaces of the plate.

14. A microchannel plate used as an electron multiplier in an image intensifier tube, the microchannel plate comprising a thin plate of glass formed from a plurality of glass fibers, said plate having an electron-receiving surface, an electron-discharge surface, and a plurality of microchannels extending between said surfaces, said microchannels having funneled openings fabricated by partially removing interface layers in an alkaline bath, the interface layers defined by cores and cladding of said fibers which form said plate.

15. The microchannel plate of claim 14, wherein said cores are removed by an acid.

16. The microchannel plate of claim 14, wherein only the openings on the electron-receiving surface are funneled.

17. The microchannel plate of claim 14, wherein the openings on the electron-receiving and electron-discharge surfaces are funneled.

18. A microchannel plate used as an electron multiplier in an image intensifier tube, the microchannel plate comprising a thin plate of glass formed from a plurality of glass fibers, said plate having an electron-receiving surface, an electron-discharge surface, and a plurality of microchannels extending between said surfaces, said microchannels having funneled openings fabricated by partially removing interface layers defined by cores and cladding of said fibers which form said plate, wherein said cladding is partially removed by an alkaline bath after said cores have been removed.

19. A method for making a microchannel plate having a plurality of microchannels with funnel-shaped openings, the method comprising the steps of:

providing a plurality of glass fibers, the fibers each having a core, a cladding, and an interface therebetween;

forming the glass fibers into a thin plate of glass;

treating the plate with an alkaline material to remove the cladding at the interface to a pre-determined depth after the cores have been removed.

20. A microchannel plate comprising:

a glass plate formed by fused glass fibers;

open ended microchannels defined by the fibers;

fiber clad walls bounding the microchannels;

wherein at least one of the open ends of each microchannel is funneled by removing the clad layer in an alkaline material at an interface of the clad layer and a core.

* * * * *

UNITED STATES PATENT AND TRADEMARK OFFICE
CERTIFICATE OF CORRECTION

PATENT NO.   : 6,311,001 B1
DATED        : October 30, 2001
INVENTOR(S)  : Steven David Rosine It is certified that error appears in the above-identified patent and that said Letters Patent is hereby corrected as shown below:

<u>Title page,</u>
Item [73], Assignee should read as:

-- Assignee: ITT Manufacturing Enterprises --.

Signed and Sealed this

Second Day of July, 2002

Attest:

JAMES E. ROGAN
Attesting Officer      *Director of the United States Patent and Trademark Office*